United States Patent [19]

Taniguchi et al.

[11] Patent Number: 5,746,939
[45] Date of Patent: May 5, 1998

[54] LIQUID CRYSTAL DEVICE

[75] Inventors: Osamu Taniguchi; Shinjiro Okada, both of Kawasaki; Kazuharu Katagiri, Tama; Junichiro Kanbe, Yokohama, all of Japan

[73] Assignee: Canon Kabushiki Kaisha, Tokyo, Japan

[21] Appl. No.: 478,445

[22] Filed: Jun. 7, 1995

Related U.S. Application Data

[62] Division of Ser. No. 750,238, Aug. 20, 1991, abandoned, which is a continuation of Ser. No. 563,856, Aug. 8, 1990, abandoned, which is a continuation of Ser. No. 853,163, Apr. 17, 1986, abandoned.

[30] Foreign Application Priority Data

Apr. 26, 1985 [JP] Japan ................. 60-090122

[51] Int. Cl.$^6$ ..................... C09K 19/52; C09K 19/02
[52] U.S. Cl. ..................... 252/299.01; 349/168; 349/175
[58] Field of Search ............ 252/299.01; 349/168, 349/175

[56] References Cited

U.S. PATENT DOCUMENTS

| | | | |
|---|---|---|---|
| 4,264,148 | 4/1981 | Gobl-Wunsch et al. | 252/299.01 |
| 4,639,089 | 1/1987 | Okada et al. | 252/299.01 |
| 4,943,387 | 7/1990 | Furukawa et al. | 252/299.01 |
| 4,969,719 | 11/1990 | Bradshaw et al. | 252/299.01 |
| 5,061,047 | 10/1991 | Bradshaw et al. | 252/299.01 |
| 5,076,962 | 12/1991 | Furukawa et al. | 252/299.01 |
| 5,250,222 | 10/1993 | Kelly et al. | 252/299.66 |

FOREIGN PATENT DOCUMENTS 136725  4/1985  European Pat. Off. .

*Primary Examiner*—Philip Tucker
*Attorney, Agent, or Firm*—Fitzpatrick, Cella, Harper & Scinto

[57] ABSTRACT

A liquid crystal device having a cell structure comprising a pair of base plates and a smectic liquid crystal having cholesteric phase at a higher temperature side; the ratio (P/d) of the spiral pitch of the cholesteric phase (P) to the spacing between the pair of base plates (d) is 0.5 or more.

43 Claims, 2 Drawing Sheets

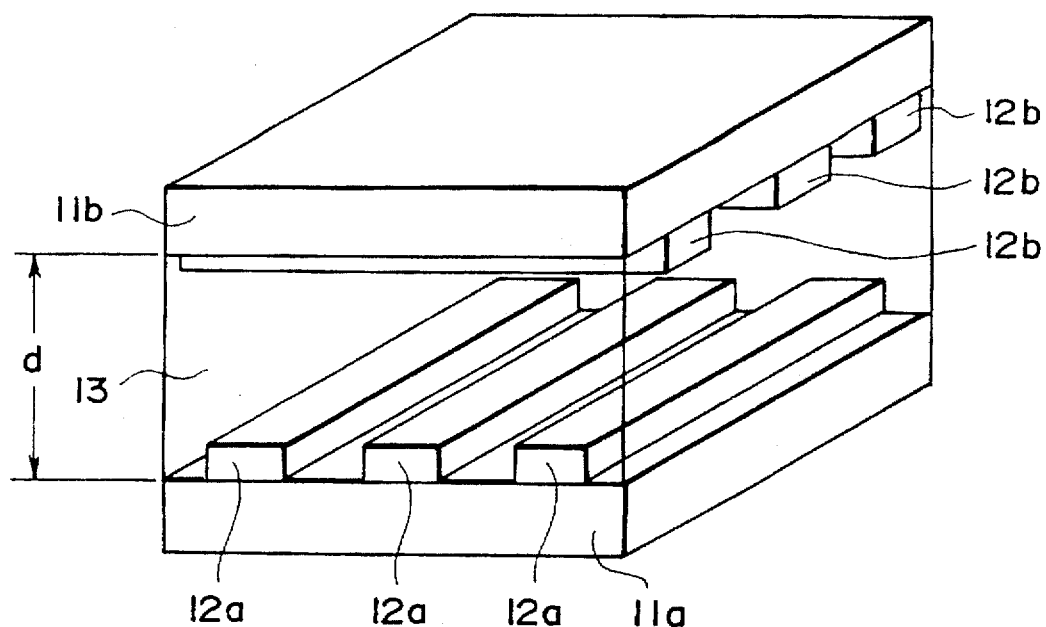
F I G. 1
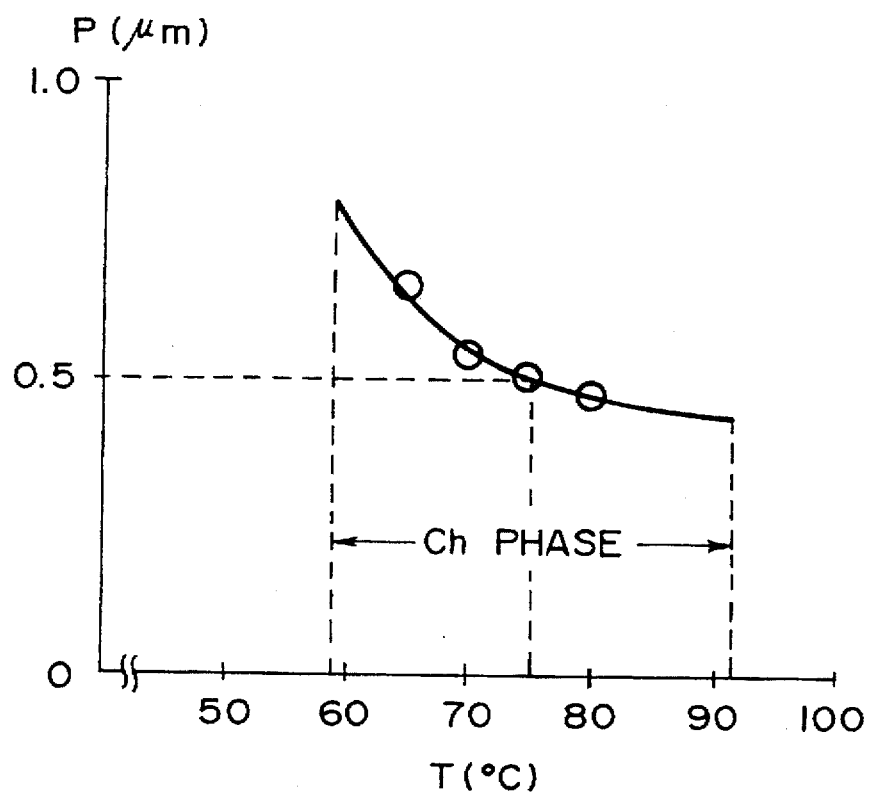
F I G. 3

LIQUID CRYSTAL DEVICE

This application is a division of application Ser. No. 07/750,238, filed Aug. 20, 1991, now abandoned which is a continuation of application Ser. No. 07/563,856, filed Aug. 8, 1990, now abandoned, which is a continuation of application Ser. No. 06/853,163, filed Apr. 17, 1986, now abandoned.

FIELD OF THE INVENTION AND RELATED ART

The present invention relates to a liquid crystal device applied to a liquid crystal display device, a liquid crystal-optical shutter array, etc., and particularly to a liquid crystal device having improved display and driving characteristics through improved initial orientation or alignment of liquid crystal molecules.

Clark and Lagerwall have proposed a liquid crystal device wherein transmission of light rays is controlled by utilizing refractive index anisotropy of ferroelectric liquid crystal molecules in combination with polarizing elements (e.g., U.S. Pat. No. 4,367,924 and Japanese Patent Laid-Open Application No. 107216/1981). The ferroelectric liquid crystal generally shows a chiral smectic C phase (SmC*) or H phase (SmH*) in a specific temperature range and, in this state, shows bistability, i.e., a property of assuming either a first stable state or a second stable state in response to an electric field applied thereto and retaining the resultant state in the absence of an electric field. The ferroelectric liquid crystal device further shows a high response speed in response to a change in electric field and is thus expected to be widely used as a high response speed display device of a memory type.

However, in order that a ferroelectric liquid crystal having bistability can realize desired driving characteristics, it is required that the liquid crystal disposed between a pair of parallel base plates has a molecular arrangement such that the molecules can effectively be switched between the two stable states independent of the application of an electric field. For instance, in connection with ferroelectric liquid crystals having SmC*- or SmH*-phase, it is required that there is formed a region (monodomain) where liquid crystal layers having SmC*- or SmH*-phase are vertical to the surfaces of base plates, i.e., the liquid crystal axes are aligned substantially in parallel with the surfaces. However, with optical modulation devices in which a liquid crystal having bistability is used, the alignment of the liquid crystal having such a monodomain structure has not satisfactorily been formed, thus failing to obtain sufficient display characteristics.

As a method for controlling alignment of the ferroelectric liquid crystal, it has been proposed to dispose an organic film or inorganic vapor deposition film provided with scratches or grooves on the inner surfaces of the base plates of a liquid crystal cell so as to control molecular alignment by rubbing or oblique vapor deposition in a similar manner as in the conventional TN type liquid crystal display device. For example, a rubbing method is carried out by first forming transparent electrodes on glass plates and, coating the electrodes with an organic polymer film and then rubbing the organic polymer film with a cloth of, e.g., velvet to align liquid crystal molecules due to fine scratches provided to the film surface. A liquid crystal device thus constructed is disclosed by Isogai in European Patent Publication (EP-A) No. 91661. However, the thus formed liquid crystal device cannot provide a chiral smectic phase wherein vertical layers of chiral smectic liquid crystal molecules aligned over a wide area so as to form a single normal, and the alignment state is not adapted for practical use.

On the other hand, in an oblique vapor deposition method, an inorganic film of, e.g., SiO is formed instead of an organic polymer film by vapor deposition onto a tilted base plate, i.e., by oblique vapor deposition. This method is disclosed by Yoshino, Japanese Journal of Applied Physics, Vol. 18 (1979), pp. 427–433. However, the liquid crystal device formed by utilizing the alignment control method taught by Yoshino results in a nonuniform alignment state wherein vertical layers of chiral smectic phase form partially different normals and is thus again unfit for a practical use.

In addition to the above methods, Clark et al have proposed a method of moving a pair of base plates relative to each other to align liquid crystal molecules (U.S. Pat. No. 4,367,924) and Yoshino has proposed a method of forming spacers of polyethylene terephthalate to provide a cell gap and utilizing the orientation characteristic of the edges of the spacers. According to any of these methods, however, it has been again difficult to provide an alignment state wherein vertical layers of chiral smectic phase are aligned so as to form a single normal.

SUMMARY OF THE INVENTION

A principal object of the present invention is to provide a ferroelectric liquid crystal device having improved siplay and driving characteristics by realizing an initial alignment state wherein vertical layers of a smectic phase, particularly a chiral smectic phase, aligned to form a single normal over a wide area.

According to the present invention, there is provided a liquid crystal device having a cell structure comprising a pair of base plates and a smectic liquid crystal having cholesteric phase at a higher temperature side; the ratio (P/d) of the spiral pitch of the cholesteric phase (P) to the spacing between the pair of base plates (d) is 0.5 or more.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic perspective view of a liquid crystal device according to the present invention;

FIG. 3 is an explanatory view showing a relationship between the spiral pitch (P) of a cholesteric phase and a temperature.

DETAILED DESCRIPTION OF THE INVENTION

Figure 2:
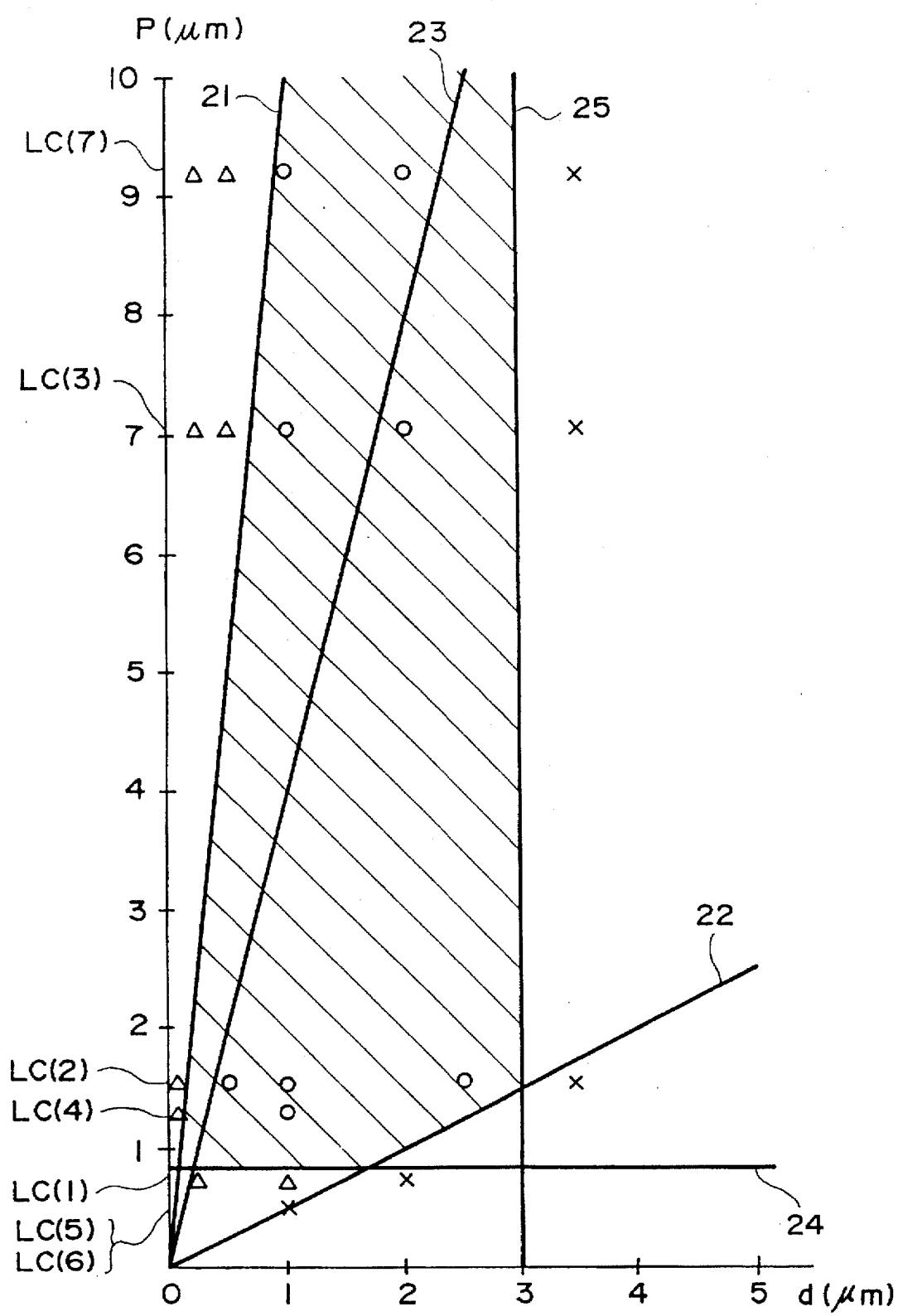
FIG. 2 is an explanatory view showing a relationship of an alignment characteristic with the thickness (d) of a liquid crystal layer and the spiral pitch (P) of a cholesteric (Ch) phase.

When the above mentioned alignment control method is used to align a ferroelectric liquid crystal, the resultant alignment state remarkably varies depending on the physical properties of the ferroelectric liquid crystal. As a physical property affecting the alignment, the difference in phase transition series may be raised. The following four patterns of phase transition series have been known for ferroelectric liquid crystals.

| PHASE TRANSITION SERIES | | | | |
|---|---|---|---|---|
| Higher Temperature side | ← | → | Lower temperature side | |
| (i) | Iso → Ch | → | SmA → | SmC* |
| (ii) | Iso → | | SmA → | SmC* |
| (iii) | Iso → Ch | | → | SmC* |
| (iv) | Iso → | | | SmC* |

(Herein, Iso denotes isotropic phase; Ch, cholesteric phase; SmA, smectic A phase).

As a result of studying alignment characteristic of SmC* in connection with the above mentioned phase transition series, a liquid crystal material showing the above mentioned phase transition series (i) shows better orientation or alignment characteristic than those showing the other phase transition series.

More specifically, in a series of experiments using the rubbing method as a uniaxial alignment control method, a ferroelectric liquid crystal showing the phase transition series (ii) such as DOBAMBC (p-decyloxybenzylidene-p'-amino-2-methylbutylcinnamate), one showing the phase transition series (iii) such as 80B mentioned hereinbelow or one showing the phase transition series (iv) such as MORA 8 did not readily show a satisfactory orientation state even where any rubbing conditions are selected. In contrast to the above, it has been discovered that an appropriate liquid crystal mixture showing the phase transition series (i) provides a much better alignment state compared with those showing the other phase transition series. A reason for the difference in phase transition series resulting in a remarkable difference in alignment characteristic may be considered due to the fact that in the course of phase transition of from isotropic phase to an SmC* or SmH* phase having a chiral layer structure, a liquid crystal showing a phase transition as the phase transition series (i) involving phases with successively decreasing degrees of symmetry can realize molecular alignment of a smectic phase with relative ease. According to further study of ours, however, all the liquid crystals showing the above phase transition series (i) do not always show a good alignment, characteristic, a sufficient condition is not simply met for a liquid crystal material to show the phase transition series (i)

As a result of further study, we have observed that a liquid crystal material having a sufficiently broad temperature range, preferably a range of 5° C. or more, for both the Ch phase and SmA phase among those showing the phase transition series (i), have a particularly improved orientation or alignment characteristic.

Based on the above observation, we have made a further study on the relationship between the alignment characteristic of a chiral smectic phase and a Ch phase while noting the Ch phase which is considered to be an intermediate state between isotropic phase and a chiral smectic phase including SmA phase and have a function of moderating abrupt change in molecular arrangement. As a result, we have discovered that the alignment characteristic in a chiral smectic phase is governed by the value of the spiral pitch of the Ch phase and the relationship between the spiral pitch of the Ch phase and the thickness of a liquid crystal layer. More specifically, the alignment characteristic is remarkably improved under conditions where the spiral pitch of a Ch phase is 0.8 μm or more and the ratio (P/d) of the spiral pitch (P, in μm) to the spacing (d, in μm) is 0.5 or more, preferably 0.5 to 10.

Hereinbelow, an embodiment of the present invention will be explained with reference to the drawings.

FIG. 1 is a schematic perspective view of an example of the liquid crystal cell according to the present invention.

This cell has been composed according to a simple dot matrix system and comprises a pair of parallel glass plates 11a and 11b, on which are respectively formed transparent electrode patterns 12a and 12b of, e.g., ITO (Indium-tin-oxide) crossing each other at substantially right angles. The base plate surfaces having the electrode patterns are respectively covered with a coating film (not shown) of, e.g., an organic polymer such as polyimide, polyvinyl alcohol or a polyamide, which has been subjected to rubbing as a uniaxial orientation treatment.

Further, the spacing d between the pair of base plates is held by spacers (not shown) disposed between the base plate surfaces. Into the liquid crystal cells thus composed, several kinds of chiral smectic liquid crystals including mixtures were sealed in. The cells were respectively raised to a temperature providing isotropic phase and gradually cooled (at a rate of, e.g., 0.5° C./hr) to cause a successive phase transition of isotropic phase, cholesteric phase, SmA phase and a chiral smectic phase such as SmC* (or SmH*), whereby the alignment state of the chiral smectic phase was examined. Incidentally, as the chiral smectic liquid crystal to be used for this purpose may also be in SmG* phase or SmF* phase.

Hereinbelow, the results of the above experiment are set forth in detail.

The specific liquid crystals used in this example are shown in the following Table 1.

TABLE 1

| | Liquid crystal | Spiral pitch (P; μm) |
|---|---|---|
| (1) | LC-1 | 0.7 |
| (2) | (LC-1)$_{90}$/(80B)$_{10}$ | 1.5 |
| (3) | (LC-1)$_{80}$/(80B)$_{20}$ | 7.1 |
| (4) | (LC-1)$_{70}$/(80B)$_{30}$ | 1.3 |
| (5) | (LC-1)$_{60}$/(80B)$_{40}$ | 0.5 |
| (6) | 80SI* | 0.5 |
| (7) | MIX-1 | 9.2 |

These liquid crystals all show the above mentioned phase transition series (i). Further, LC-1 and 80B both shown in Table 1 have mutually different spiral directions in their cholesteric phase. As will be understood from Table 1, the spiral pitch (P) in cholesteric phase can be increased by mixing a liquid crystal having a dextro-rotatory spiral and a liquid crystal having a levo-rotatory spiral with each other.

In the above Table 1, LC-1, 80B and 80SI* are compounds represented by the following structural formulas and MIX-1 is a liquid crystal mixture having the composition shown below. Further, the suffixes shown in Table 1 denote weight proportions of respective components followed thereby.

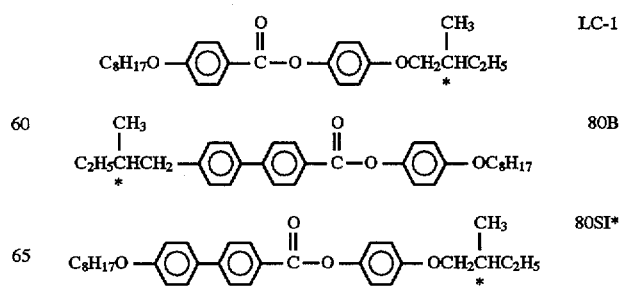

MIX-1

A liquid crystal composition consisting mainly of p-n-octyloxybenzoic acid-p'-(2-methylbutyloxy)phenyl-ester and p-n-nonyloxybenzoic acid-p'-(2-methylbutyloxy)phenyl-ester FIG. 2 shows the results of change in alignment characteristic in connection with the spiral pitch (P) of the cholesteric phase of the respective liquid crystals and by varying the spacings (d) between a pair of base plates. The symbol ◯ denotes a good alignment state. (a uniform alignment state wherein the vertical layers of a chiral smectic phase are aligned to form a single normal over the entire cell); Δ, a rather inferior alignment state (i.e., an alignment state wherein the vertical layers of a chiral smectic phase are aligned to form different domains having different normals); and an inferior alignment state (i.e., an alignment state wherein the vertical layers of a chiral smectic phase are aligned at random providing totally ununiform arrangement of normals).

The spiral pitch of Ch phase was measured by the Grandjean-Cano method as disclosed in page 265 of "The Physics of Liquid Crystals" written by P. G. de Gennes published in 1974 from Oxford University Press Ely House, London. More specifically, the spiral pitch of Ch phase was measured by using a wedge-shaped cell of which the inclination angle was preliminarily measured and by measuring distances between fringes occurring in the Ch phase corresponding to the spiral pitch.

The inclination angles of the wedge-shaped cells all had a tan θ of $(1.34\pm0.07)\times10^{-3}$ according to a measurement by using monochromatic light (D-line of sodium) and utilizing interference of the light on the glass surfaces of the wedge-shaped cells.

Further, the spiral pitch of a Ch phase generally depends on the temperature and varied as shown in FIG. 3 for example, with respect to the composition of $(LC-1)_{60}/(80B)_{40}$. The spiral pitch used herein refers to one measured at the midpoint in a temperature range providing Ch phase for the respective liquid crystals concerned. The thus measured values of spiral pitch of Ch phase are listed in Table 1.

The linear lines 21 and 22 in FIG. 2 represent the relationships of P=0.5 d and P=10 d, respectively. As will be understood from FIG. 2, while the liquid crystal cells falling within the region defined between the lines 21 and 22 showed a better characteristic in formation of monodomain of smectic phase compared with those outside the region, the liquid crystal cells in the region defined between the lines 23 and 22 provided an alignment state with a still better reproducibility. More specifically, as shown in FIG. 2, the above mentioned MIX-1 having a spiral pitch of Ch phase of 9.2μ did not provide an alignment state with sufficient bistability required for switching in a liquid crystal cell having a spacing between the base plates of 0.25 μm, while it could form a monodomain of smectic phase showing good bistability in liquid crystal cells with spacings of 1 μm and 2 μm. It would be readily understood that the other liquid crystals, e.g., $(LC-1)_{90}/(80B)_{10}$ and $(LC-1)_{70}/(80B)_{30}$ showed the same tendency.

In this way, according to the present invention, a remarkably good alignment state can be attained when a liquid crystal cell is formed in such a manner as to satisfy the relationship that the ratio (P/d) between the spiral pitch of Ch phase (P, μm) and the spacing between the base plates (d, μm) is 0.5 to 10, preferably 0.5 to 4.

A reason why the above relationship is required for a good alignment characteristic of smectic phase may be as follows.

As the spiral axis of Ch phase is considered to be substantially parallel with the thickness direction of a liquid crystal layer, the ratio between the spiral pitch of Ch phase and the spacing between the base plates (thickness of a liquid crystal layer) may be considered to be a parameter representing the number of spirals in Ch phase. Thus, in a case where the spiral number in Ch phase satisfies the above relationship, phase transition from Ch phase into SmA phase on temperature decrease may be smoothly caused to provide a good alignment state in chiral smectic phase.

Further, through our experiments, it has been also formed that when a smectic liquid crystal showing Ch phase with a spiral pitch not reaching 0.8 μm is used, a sufficient alignment state required for switching cannot be obtained unless the orientation controlling treatment is conducted under extremely good conditions. A reason for this may be that with respect to a smectic liquid crystal having a Ch phase spiral pitch as thin as less than 0.8 μm, the spiral structure of the Ch phase cannot be sufficiently unwound by simply controlling the thickness of the liquid crystal layer so that it becomes difficult to form a layer structure of SmA phase uniformly, since a liquid crystal having a very short spiral pitch essentially has a strong winding force in the Ch phase. As a result, in a liquid crystal cell falling within the region surrounded by a line 24 represented by P=0.8 μm and lines 21 and 22, preferably within the region surrounded by the lines 24, 23 and 22, an alignment state of a smectic phase monodomain can be obtained.

Further, when the application of a ferroelectric liquid crystal to an optical switching element represented by a display element and a linear shutter array is considered, a surface stabilization type memory cell as disclosed by Clark and Lagerwall in Applied Physics Letters Vol. 36, No. 11, pp. 899–901, "Submicrosecond bistable electrooptic switching in liquid crystals" (Jun. 1, 1980), is considered to be most effective one, wherein the layers of a chiral smectic phase with an unwound spiral structure even in the absence of an electric field are formed perpendicular to base plate faces and the liquid crystal molecules are aligned in parallel with the base plate faces to have bistability.

According to our experiments, it has been understood that it is necessary to the spacing d between base plates (i.e., the thickness of a liquid crystal layer) to be 3 μm or less in order to prepare the above mentioned surface stabilization type memory cell. As a result, in order to prepare a surface stabilization type memory cell, a liquid crystal device having an extremely good alignment state and bistability can be obtained when a liquid crystal is prepared so as to fall within the hatched region surrounded by four linear lines 21, 22, 24 and 25 (line 25 represents d=3 μm), preferably within the region surrounded by four lines 23, 22, 24 and 25, in FIG. 2.

As explained hereinabove, in preparing a liquid crystal cell, the thickness of the liquid crystal layer (d) and the spiral pitch in the Ch phase (P) are selected, preferably so as to fall within the hatched region in FIG. 2, whereby a monodomain with a uniform initial alignment and bistability can be realized, and a ferroelectric liquid crystal device excellent in display and driving characteristics can be obtained.

What is claimed is:

1. A liquid crystal device, comprising a pair of substrates and a chiral smectic liquid crystal disposed between the substrates; wherein said chiral smectic liquid crystal has a temperature range where it assumes cholesteric phase on a higher temperature side than its chiral smectic phase and has a spiral pitch in the cholesteric phase which increases on temperature decrease including a spiral pitch P (μm) measured at a mid temperature in the temperature range of cholesteric phase satisfying a ratio of P/d of at least 0.5 with respect to a spacing d (μm) between the substrates, said chiral smectic liquid crystal being placed in its chiral smectic phase formed by cooling through the temperature range of cholesteric phase.

2. A liquid crystal device according to claim 1, wherein said chiral smectic liquid crystal has temperature ranges where it assumes smectic A phase and cholesteric phase on a higher temperature side than its chiral smectic phase.

3. A liquid crystal device according to claim 2, wherein the temperature ranges of smectic A phase and cholesteric phase respectively have at least 5° C.

4. A liquid crystal device according to claim 1, wherein said pair of substrates are respectively provided with a rubbed polyimide film.

5. A liquid crystal device according to claim 1, wherein said chiral smectic liquid crystal comprises a liquid crystal compound having a dextro-rotatory spiral and a liquid crystal compound having a levo-rotatory spiral, respectively in cholesteric phase.

6. A liquid crystal device according to claim 5, wherein said chiral smectic liquid crystal has temperature ranges where it assumes smectic A phase and cholesteric phase on a higher temperature side than its chiral smectic phase.

7. A liquid crystal device according to claim 6, wherein the temperature ranges of smectic A phase and cholesteric phase respectively have at least 5° C.

8. A liquid crystal device according to claim 5, wherein said pair of substrates are respectively provided with a rubbed polyimide film.

9. A liquid crystal device, comprising:
two cell walls each having an electrode structure, at least one cell wall having been treated for aligning liquid crystal molecules;
a chiral smectic liquid crystal material disposed in a layer thickness between the two cell walls; and
first and second polarizers, wherein said liquid crystal material is characterized by:
 (i) plural switching states and chiral smectic phase at an ordinary device operation temperature, and cholesteric phase at a temperature higher than the operation temperature and an environmental temperature,
 (ii) at least one species of material component showing a levo-rotatory cholesteric spiral,
 (iii) at least one species of material component showing a dextro-rotatory cholesteric spiral,
 (iv) a smectic pitch larger than the layer thickness,
 (v) a cholesteric pitch at least 0.5 times the layer thickness given by mixing the levo-rotatory material component and the dextro-rotatory material component, and
 (vi) a ferroelectricity given by mixing the levo-rotatory material component and the dextro-rotatory material component.

10. A liquid crystal device, comprising:
two cell walls each having an electrode structure, at least one cell wall having been treated for aligning liquid crystal molecules;
a chiral smectic liquid crystal material disposed in a layer thickness between the two cell walls; and
first and second polarizers, wherein said liquid crystal material has:
 (i) chiral smectic phase at an ordinary device operation temperature, and cholesteric phase at a temperature higher than the operation temperature and an environmental temperature,
 (ii) a smectic pitch larger than the layer thickness,
 (iii) a cholesteric pitch at least 0.5 times the layer thickness in the cholesteric phase, and
 (iv) a ferroelectricity in the smectic phase.

11. A device according to claim 10, wherein the electrode structure on each substrate comprises stripe electrodes so as to form an electrode matrix in combination.

12. A device according to claim 10, wherein the liquid crystal layer thickness is at most 3 μm.

13. A device according to claim 10, wherein the first and second polarizers have optical axes intersecting each other.

14. A device according to claim 10, further including means for applying different electric fields to the electrode structure to cause a switching between two different states of the liquid crystal material.

15. A process for producing a liquid crystal display device, comprising the steps of:
disposing two cell walls each having on an inner side thereof an electrode structure including at least one wall surface treated for aligning a liquid crystal with a space therebetween so as to contain a liquid crystal material in a layer thickness therein,
providing a chiral smectic liquid crystal material having cholesteric phase at a temperature higher than an environmental temperature and between chiral smectic phase and isotropic phase, having a cholesteric pitch at least 0.5 times the layer thickness in the cholesteric phase, having a ferroelectricity in the chiral smectic phase and having a pitch larger than the layer thickness in the smectic phase;
introducing and hermetically sealing the liquid crystal material in the space; and
cooling the material from the cholesteric phase to the chiral smectic phase.

16. A liquid crystal device, comprising:
two cell walls each having an electrode structure, at least one cell wall having been treated for aligning liquid crystal molecules;
a chiral smectic liquid crystal material disposed in a layer thickness between the two cell walls; and
first and second polarizers, wherein said liquid crystal material is characterized by:
 (i) plural switching states and chiral smectic phase at an ordinary device operation temperature, and cholesteric phase at a temperature higher than the operation temperature and an environmental temperature,
 (ii) at least one species of material component showing a levo-rotatory cholesteric spiral,
 (iii) at least one species of material component showing a dextro-rotatory cholesteric spiral,
 (iv) a smectic pitch larger than the layer thickness,
 (v) a cholesteric pitch at least 0.5 times the layer thickness at mid temperature in the cholesteric temperature range given by mixing the levo-rotatory material component and the dextro-rotatory material component, and
 (vi) a ferroelectricity given by mixing the levo-rotatory material component and the dextro-rotatory material component.

17. A liquid crystal device, comprising:
two cell walls each having an electrode structure, at least one cell wall having been treated for aligning liquid crystal molecules;
a chiral smectic liquid crystal material disposed in a layer thickness between the two cell walls; and
first and second polarizers, wherein said liquid crystal material has:

(i) chiral smectic phase at an ordinary device operation temperature, and cholesteric phase at a temperature higher than the operation temperature and an environmental temperature, (ii) a smectic pitch larger than the layer thickness, (iii) a cholesteric pitch at least 0.5 times the layer thickness at mid temperature in the cholesteric temperature range, and (iv) a ferroelectricity in the smectic phase.

18. A device according to claim 17, wherein the electrode structure on each substrate comprises stripe electrodes so as to form an electrode matrix in combination.

19. A device according to claim 17, wherein the liquid crystal layer thickness is at most 3 µm.

20. A device according to claim 17, wherein the first and second polarizers have optical axes intersecting each other.

21. A device according to claim 17, further including means for applying different electric fields to the electrode structures to cause a switching between two different states of the liquid crystal material.

22. A process for producing a liquid crystal display device, comprising the steps of:

disposing two cell walls each having on an inner side thereof an electrode structure including at least one wall surface treated for aligning a liquid crystal with a space therebetween so as to contain a liquid crystal material in a layer thickness therein;

providing a chiral smectic liquid crystal material having cholesteric phase at a temperature higher than an environmental temperature and between chiral smectic phase and isotropic phase, having a cholesteric pitch at least 0.5 times the layer thickness at mid temperature in the cholesteric range, having a ferroelectricity in the chiral smectic phase and having a pitch larger than the layer thickness in the smectic phase;

introducing and hermetically sealing the liquid crystal material in the space; and cooling the material from the cholesteric phase to the chiral smectic phase.

23. A liquid crystal device, comprising:

a pair of base plates providing at least one surface with a uniaxial orientation treatment, and a chiral smectic liquid crystal disposed between the base plates and which causes a phase transition through cholesteric and smectic A into chiral smectic phase upon temperature decrease, the spacing (d) between the pair of base plates suppressing the spiral structure of the chiral smectic phase and satisfying the relationship of P/d being at least 0.5 with respect to the spiral pitch (P) in the cholesteric phase, said chiral smectic liquid crystal being formed by cooling through cholesteric and smectic A phases into chiral smectic phase so as to provide an alignment state wherein each molecule of the liquid crystal is oriented to either one of two different orientation states in the absence of an electric field.

24. A liquid crystal device according to claim 23, wherein said spiral pitch of the cholesteric phase is 0.8µ or more at the midpoint in a temperature range providing the cholesteric phase.

25. A liquid crystal device according to claim 23, wherein said spacing between the pair of base plates (d) is 3 µm or less.

26. A liquid crystal device according to claim 23, wherein said ratio (P/d) satisfies the relationship $0.5 \leq P/d < 10$.

27. A liquid crystal device according to claim 23, wherein said ratio (P/d) satisfies the relationship $0.5 \leq P/d < 4$.

28. A liquid crystal device according to claim 23, wherein said wall surface treatment is a rubbing uniaxial orientation treatment.

29. A liquid crystal device according to claim 23, wherein said at least one surface is formed by an insulating material.

30. A liquid crystal device according to claim 29, wherein said insulating material is polyimide, polyvinyl alcohol or polyamide.

31. A liquid crystal device according to claim 23, wherein said smectic liquid crystal is a composition comprising a liquid crystal having a dextro-rotatory spiral in cholesteric phase and a liquid crystal having a levo-rotatory spiral in cholesteric phase.

32. A liquid crystal device according to claim 23, wherein said chiral smectic liquid crystal has been formed through a successive phase transition of cholesteric phase, smectic A phase and chiral smectic phase, said cholesteric phase and smectic A phase respectively having a temperature range of 5° C. or more.

33. A liquid crystal device according to claim 23, wherein said chiral smectic liquid crystal shows cholesteric phase in which the spiral pitch increases according to temperature decrease.

34. A liquid crystal device, comprising:

a pair of base plates having at least one surface with a uniaxial orientation treatment, and a chiral smectic liquid crystal disposed between the base plates which exhibits a phase transition through cholesteric and smectic A into chiral smectic phase upon temperature decrease, said chiral smectic liquid crystal containing two compounds including one showing a dextro-rotatory spiral and the other showing a levo-rotatory spiral respectively in cholesteric phase, the spacing between the base plates suppressing the spiral structure of the chiral smectic phase, said chiral smectic liquid crystal having been formed by cooling through cholesteric and smectic A phases into chiral smectic phase so as to provide an alignment state wherein each molecule of the liquid crystal is oriented to either one of two different orientation states in the absence of an electric field.

35. A liquid crystal device according to claim 34, wherein said uniaxial orientation treatment is a rubbing treatment.

36. A liquid crystal device according to claim 34, wherein said base plate surface is an insulating material.

37. A liquid crystal device according to claim 36, wherein said insulating material is polyimide, polyvinyl alcohol or polyamide.

38. A liquid crystal device according to claim 34, wherein said cholesteric phase and smectic A phase respectively have a temperature range of 5° C. or more during the course of temperature decrease.

39. A liquid crystal device according to claim 34, wherein said chiral smectic liquid crystal shows cholesteric phase in which the spiral pitch increases according to temperature decrease.

40. A method of making a liquid crystal display device, comprising the steps of:

providing two cell walls spaced apart by a spacer to contain a layer of a liquid crystal material, the wall inner surfaces having formed thereon electrode structures and at least one wall surface treated to provide a liquid crystal alignment;

providing a tilted chiral smectic liquid crystal material having a cholesteric phase at a temperature above ambient temperature between the chiral smectic and isotropic phases with a cholesteric pitch (P) greater than half the layer thickness (d) at a temperature at least 0.1° C. above a cholesteric to smectic transition temperature and a significant spontaneous polarization Ps in the chiral smectic phase;

heating the material to the cholesteric phase;

introducing and sealing the material into the space between the walls; and cooling the material to the tilted chiral smectic phase.

41. The method of claim 40, wherein the material is cooled at a rate of 0.5° C./hr through the cholesteric/smectic phase transition.

42. The method of claim 40, wherein the alignment is produced by unidirectional rubbing.

43. The method of claim 40, wherein the alignment is produced by oblique evaporation of silicon oxide.

* * * * *

UNITED STATES PATENT AND TRADEMARK OFFICE
CERTIFICATE OF CORRECTION

PATENT NO. : 5,746,939

DATED : May 5, 1998

INVENTOR(S) : OSAMU TANIGUCHI, ET AL.

It is certified that error appears in the above-identified patent and that said Letters Patent is hereby corrected as shown below:

<u>COLUMN 2</u>

Line 27, "siplay" should read --display--; and
    Line 62, "varies" should read --varies,--.

<u>COLUMN 5</u>

Line 35, "3" should read --3,--.

<u>COLUMN 9</u>

Line 65, "$0.5 \leq P/d < 10.$" should read --$0.5 < P/d \leq 10.$--; and
    Line 67, "$0.5 \leq P/d < 4.$" should read --$0.5 < P/d \leq 4.$--.

Signed and Sealed this

Twenty-fourth Day of November, 1998

BRUCE LEHMAN

Attest:

*Attesting Officer*      *Commissioner of Patents and Trademarks*